Figure 2:
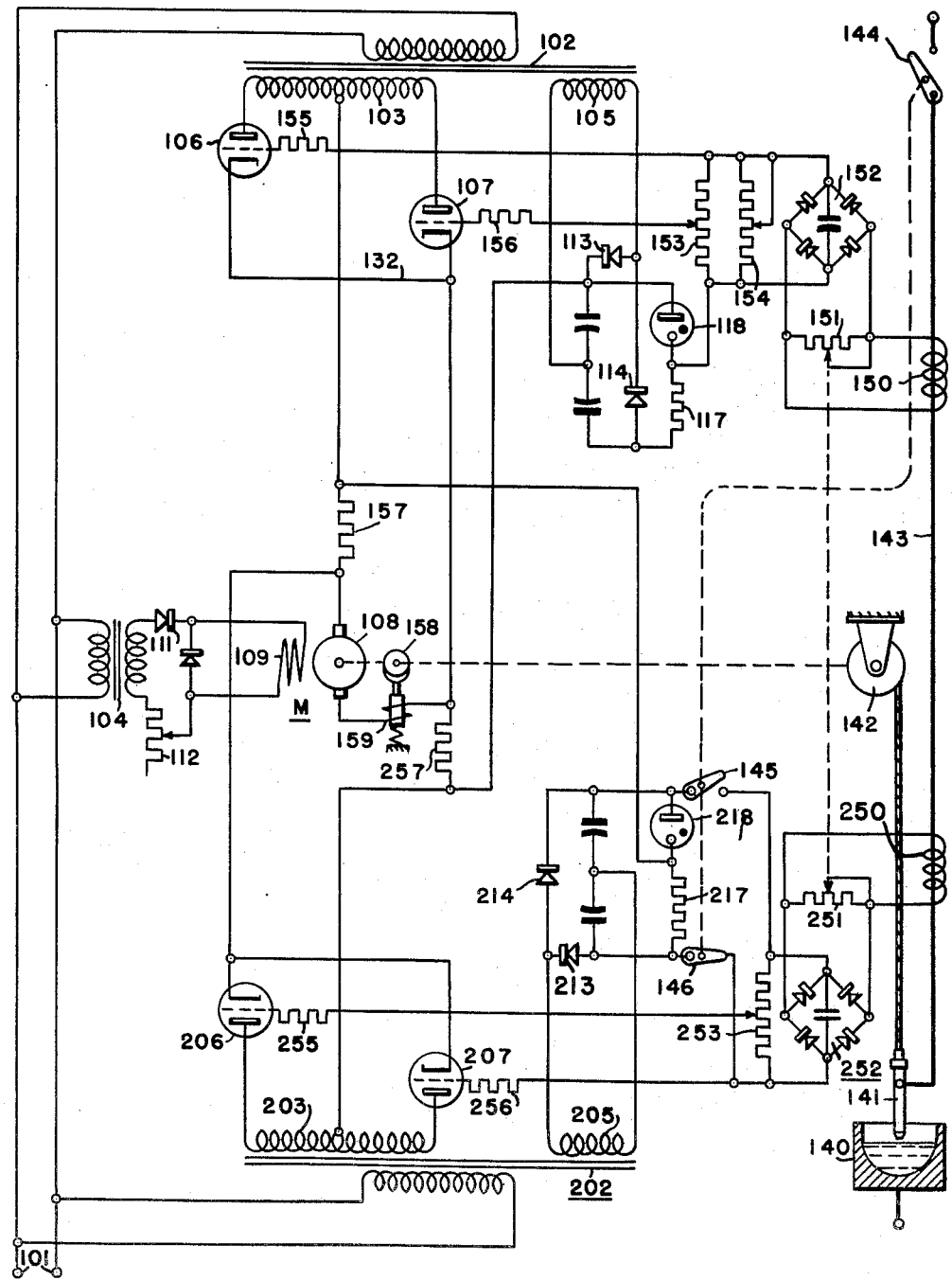

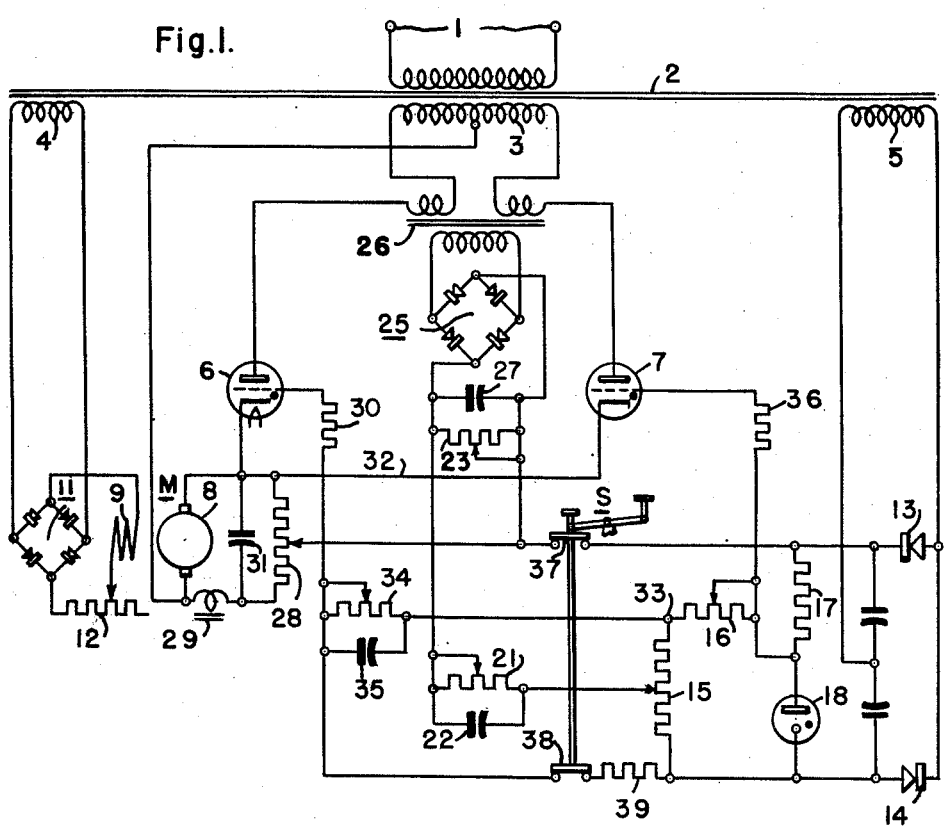
Fig. 1.
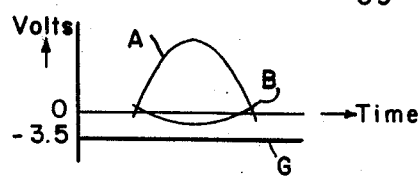
Fig. 3.
Fig. 4.
Fig. 5.
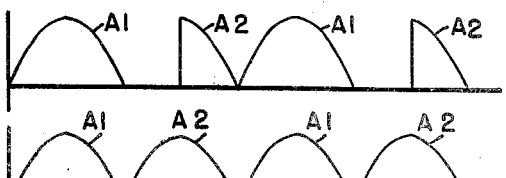
Fig. 6.
Fig. 7.
INVENTOR
John E. Raymond.

Patented Dec. 20, 1949

2,492,007

UNITED STATES PATENT OFFICE 2,492,007

ELECTRONIC SYSTEM FOR ENERGIZING DIRECT-CURRENT MOTORS FROM AN ALTERNATING-CURRENT SOURCE

John Edwin Raymond, Hamilton, Ontario, Canada, assignor to Canadian Westinghouse Company, Limited, Hamilton, Ontario, Canada Application October 12, 1948, Serial No. 54,096

9 Claims. (Cl. 318—257)

1

My invention relates to electronic systems for energizing a direct-current load, such as a motor, from an alternating-current source.

It is an object of the invention to provide an electronic control system of the kind mentioned that affords a satisfactory voltage regulation over a wide range with less intricate electronic means and, generally, a smaller number of electronic tubes than heretofore customary for such purposes.

An other object of the invention is to provide an electronic control system which is capable of controlling a direct-current motor to reverse its running direction in dependence upon the occurrence and direction of a departure from a desired current, voltage or other magnitude, and which affords a good speed regulation of the motor for either running direction with the aid of comparatively simple and few electronic accessories.

Alternating-current energized systems of the general kind here concerned are equipped with controllable arc or gas discharge tubes, such as thyratrons or ignitrons, that are connected with the load or motor in a full-wave rectifying arrangement. It is known that such tubes can be triggered either by a phase-displaceable periodic control voltage synchronous with the alternating anode voltage, or by a unidirectional control voltage of variable magnitude. The application of a synchronous periodic control voltage permits controlling the rectifying tubes practically from zero conductance to full conductance, while the control heretofore effected with a unidirectional control voltage permits a variation and regulation of the tube conductance only between half-phased and full-phased values. It is, therefore, also an object of the invention to secure with the aid of a unidirectional control voltage a control or regulation of the rectified voltage over a range wider than heretofore obtainable, in particular down to quarter-phased conductance of the full-wave rectifier arrangement.

According to one feature of my invention, I provide the controllable rectifier tubes of a full-wave rectifier arrangement for a direct-current load with control or grid circuits that are impressed by unidirectional voltages only so as to be triggered in response to the variations of a condition-responsive component of these voltages; and I differentiate the value of the control voltages relative to the respective tubes so that the tubes are triggered at different magnitudes of the condition-responsive component. For instance, when the condition-responsive component becomes less negative, first one tube is trig-

2 gered to conduct in half-phased operation, then the conductance of the same tube is gradually increased up to full-phased conductance, while the other tube is triggered only after the first tube has almost or fully reached full-phase conductance. In this manner, the rectified voltage can be changed from quarter-phased condition to full-phased condition, i. e., between less than 25% and 100% rated voltage.

According to another feature of the invention, the condition-responsive component of the tube control voltage is directly derived from the load circuit by potentiometric or impedance means, that is, this component grid voltage is taken from across a resistance element connected in series or in parallel with the output circuit of the controlled rectifier tubes, if necessary with application of filtering means, under avoidance of intermediate amplifier or separate current sources. In this manner, the number of auxiliary electronic tubes and appertaining accessories is reduced to a minimum.

Other objects and features of my invention will be apparent from the following description in conjunction with the embodiments exemplified by the drawings, in which:

Figure 1 shows the circuit diagram of a control system for a non-reversible motor, Fig. 2 is a control system for an arc furnace regulator equipped with a reversible motor, while Figs. 3 through 7 are explanatory voltage diagrams relating to the system of Fig. 2.

The alternating-current terminals 1 of the motor control system shown in Fig. 1 are connected to the primary of a transformer 2 with secondaries 3, 4 and 5. Two thyratrons 6 and 7 energize the armature 8 of the motor to be controlled from the secondary 3 in full-wave rectifier connection. The field winding 9 of the motor is excited from secondary 4 through a rectifier 11 and a field rheostat 12.

Another rectifier circuit with rectifiers 13 and 14 is energized from the secondary 5 and applies its output voltage across a potentiometric series connection of resistors 15, 16 and 17. A cold-cathode voltage regulator tube 18 is connected across resistors 15 and 16 in order to maintain constant direct-current voltage across these resistors. Normal line voltage variations and the cyclic ripple voltage from the circuit of rectifiers 13 and 14 are absorbed across resistor 17. Resistor 16 provides an adjustment of one or two volts to take care of manufacturing variations in the grid firing characteristics of the two thyratrons. Resistor 15 has a slider or tap contact whose adjustment determines the speed at which the motor is intended to operate. This slider is connected to an adjustable resistor 21 to which a capacitor 22 is parallel connected. Resistor 21 lies in series with an adjustable resistor 23. A variable direct-current voltage proportional to the average load current in the thyratron circuit is impressed across resistors 23 by a rectifier 25 energized from a transformer 26 which has two primaries connected in the respective plate circuits of thyratrons 6 and 7. A smoothing capacitor 27 is connected across resistor 23.

A potentiometric resistor 28 is connected across the terminals of armature 8 in series with a filtering reactor 29, a capacitor 31 being connected across resistor 28. The voltage drop impressed across resistor 28 is proportional to the armature terminal voltage of the motor.

The grid circuit for thyratrons 6 and 7 can be traced from the common cathode lead 32 of the thyratrons through resistor 28, resistor 23, resistor 21, and a tapped-off portion of resistor 15 to point 33. From this point, the grid circuit for thyratron 6 extends through resistor 34, and a resistor 30 to the grid of the tube, while the grid circuit for thyratron 7 extends from point 33 through resistor 16 and a resistor 36 to the grid.

The system is equipped with a control switch or contactor with contacts 37 and 38. Both contacts are closed only when the motor is at rest and are to be opened in order to start and operate the motor.

The above-mentioned grid circuit for thyratrons 6 and 7 includes two main sources of series opposed direct-current voltages. One of these sources is represented by the adjusted tapped portion of rheostat 15. The adjusted constant voltage across this portion determines the desired motor speed and imposes a positive potential on the grids of both thyratrons relative to the respective cathodes tending to operate the thyratrons full-phased, i. e., with maximum conductance. The second main source of grid voltage in the grid circuit of thyratrons 6 and 7 is represented by the tapped-off portion of resistor 28 which provides a variable direct-current voltage proportional to the armature terminal voltage. The tapped-off voltage is of the same order of magnitude as the adjusted control voltage but of opposite polarity so as to reduce the firing angle and conductance of the thyratrons.

Assuming for a moment that the just-mentioned two grid voltages are the only ones effective in the thyratron grid circuit and that the armature voltage effective across resistor 28 is roughly proportional to the motor speed, the system operates in the following manner.

The thyratron grids may be biased at any positive potential with respect to the cathodes by adjusting the potentiometer rheostat 15. This has the results that with any selected adjustment of rheostat 15, the thyratrons conduct in full-phased operation and accelerate the motor until its armature voltage and consequently the thyratron cathode voltage exceeds the selected grid voltage. From then on, the pickup point of the thyratrons is gradually reduced to the half-phased firing point and, if the speed and voltage of the motor armature still continue to rise, conduction of the thyratrons will be completely discontinued owing to the thyratron grid voltage becoming negative with respect to the cathode voltage. A subsequent slight drop in speed and cathode voltage will result first in half-phased pickup of the thyratrons. However, if the load continues to slow the motor down, full-phased conduction will result. In this manner, the motor speed is maintained substantially at the desired value. The motor speed may be adjusted within a range from the rated base speed down to a speed value equivalent to a few volts by adjustment of rheostat 15. Increasing the motor speed above the base speed may be accomplished in the conventional manner by adjustment of field rheostat 12.

If the torque on the motor changes, the voltage taken from across the active portion of resistor 28 is no longer a sufficiently accurate measure of the motor speed. However, the resistor 23 represents another source of voltage for the grid circuit of thyratrons 6 and 7. This voltage is proportional to the load current and IR drop of the motor circuit and serves for compensating the changes in motor speed caused by changes in IR drop. To this end the voltage across resistor 23 is applied directly to increase the thyratron grid voltage in a positive direction by an amount which may be adjusted by the slider of resistor 23 to exactly compensate for the IR drop in the motor armature.

When the control switch or contactor is placed in stop position so that contacts 37 and 38 are closed, a negative voltage is applied to the thyratron grids through resistor 39 and causes the motor to stop. While the switch is in the stop position, capacitors 22 and 35 become charged across resistors 21 and 34, respectively. The time constant of the circuit of capacitor 22 and resistor 21 is less than that of the circuit formed by capacitor 35 and resistor 34, and the time constant of the circuit 21—22 is in the order of the motor full speed accelerating time. With such an adjustment of the time constants, the opening of contacts 37 and 38 has the result that the motor is accelerated by alternate half-cycle impulses of ¼ to ½ cycle duration through the thyratron 7 only. Only after capacitors 22 and 35 are discharged is the thyratron 6 in condition to fire so that, from then on, both thyratrons are in operation. In this manner, the starting current of the motor is limited to a value within the overload capacity of the thyratrons.

The embodiment illustrated in Fig. 2 is a system for the reversible control of a motor M and designed as a current regulator for an arc furnace.

The system is energized from alternating-current terminals 101 through transformers 102, 202 and 104. Transformer 102 has secondary windings 103, 105, and transformer 202 has secondary windings 203, 205. Two thyratrons 106, 107 are connected to winding 103 for energizing the armature 108 of the motor M in full-wave rectification. Two thyratrons 206 and 207 are disposed between winding 203 and the armature circuit of motor M in a full-wave rectifying arrangement. The connections of the two rectifier sets with the armature 108 are oppositely poled so that the motor runs in the electrode-raising direction when rectifiers 106, 107 are conductive and in the electrode-lower direction when rectifiers 206, 207 conduct. The field winding 109 of the motor is excited from transformer 104 through rectifiers 111 and through a field rheostat 112.

Connected to the secondary 105 of transformer 102 is a rectifier circuit with two rectifiers 113 and 114 whose output circuit extends through a resistor 117 and a cold-cathode tube 118. Due to the voltage stabilizing function of tube 118, the voltage across this tube is constant while fluctuations of the line voltage are absorbed by resistor 117. The voltage drop across tube 118 is applied as a constant bias voltage to the grid circuit of tubes 106 and 107.

Similarly, the secondary 205 of transformer 202 energizes a rectifier circuit with rectifiers 213, 214 whose output voltage is impressed across a resistor 217 and a voltage regulating cold-cathode tube 218. The voltage drop across tube 218 is applied as a constant bias to the grid circuit of tubes 206 and 207.

The arc furnace whose current is to be regulated is represented at 140 and its movable electrode is denoted by 141. The electrode is raised and lowered by a cable from a drum 142 which is driven by the armature 108 of motor M. Current is supplied to the furnace through a cable 143 under control by main contact 144 of a circuit breaker which is also equipped with auxiliary contacts 145 and 146.

Two current transformers 150 and 250 are associated with cable 143. The secondary voltage of transformer 150 is impressed across a rheostat 151 whose slide contact is ganged up with the slide contact of a similar rheostat 251 connected across the current transformer 250. The voltage from across rheostat 151 energizes a rectifier 152 whose output voltage is impressed across a rheostat 153. A similar rectifier 252 and rheostat 253 are associated with the rheostat 251. The positive terminal of rheostat 153 is connected through a resistor 155 to the grid of thyratron 106, and the slide contact of the same rheostat is connected through a resistor 156 to the grid of thyratron 107. Resistors 255 and 256 connect the grids of thyratrons 206 and 207, respectively, with the slide contact and negative terminal of rheostat 253.

The motor is equipped with a spring-set friction brake 158 whose magnetic releasing coil 159 is series-connected in the armature circuit.

When the circuit breaker is open, i. e., when contacts 144, 145 and 146 have the positions illustrated in Fig. 2, there is no current flow to the furnace so that the voltages impressed across rheostats 151 and 251 are zero. Therefore, the grids of the electrode-raise thyratrons 106 and 107 are negatively biased by the constant direct-current voltage across tube 118, and the grids of the electrode-lower thyratrons 206 and 207 are also negatively biased through contact 146 of the circuit breaker by the voltage across the resistor 217. When the circuit breaker is closed and assuming that the electrode 141 is at first out of contact with the furnace charge so that transformers 150 and 250 are deenergized, the contact 145, now closed, applies a positive potential to the grids of the thyratrons 206 and 207 while the previously effective negative potential is eliminated by the opening of contact 146. Consequently, the motor armature 108 becomes energized through thyratrons 206 and 207 and lowers the electrode 141 into the contents of the furnace. Current starts to flow through cable 143, and the voltages across rheostats 151 and 251 assume increasing values. Thus the furnace current increases to a value determined by the selected setting of rheostat 251 at which the rectified voltage supplied by the current transformer 250 to rheostat 253 becomes more negative than the positive voltage across the tube 218. At this instant, the thyratrons 206 and 207 cease to conduct and the motor is stopped by the deenergization of the brake coil 159.

The regulating characteristics of the system can best be explained with reference to definite numerical values. It will, therefore, be assumed, by way of example, that the regulated direct-current voltage across tubes 118 and 218 is 150 volts, the thyratron grid pick-up voltage is zero volts at approximately 20 volts anode potential, and —3 volts at maximum anode voltage (see Fig. 3); and the adjustment of resistors 151, 154 and 251 is such that with 100% selected current flowing to the furnace electrode the direct-current voltage across resistor 153 is 146.5 volts and that across resistor 253 is 153.5 volts.

Under the above conditions, as long as the current flowing to the furnace electrode remains at 100%, i. e., at the selected value, a grid bias of —3.5 volts is applied to all thyratrons and no change in electrode position will occur. An increase of ½% in the furnace electrode current increases the voltage across resistor 153 to 147.2 volts. This results in a grid bias to thyratrons 106 and 107 of —2.8 volts which will trigger them off at the half phased position. Thus the motor is energized at approximately half voltage in a direction to raise the furnace electrode. Movement of the electrode will in turn lower the electrode current, which upon dropping a fraction of one percent will lower the voltage across resistor 153 to 147 volts or less. This causes the thyratrons 106 and 107 to become non-conducting and the motor brake to be applied preventing further movement of the electrode.

In connection with the above operation, it will be noted that the increase of ½% over the selected electrode current results in the grid bias to thyratrons 206 and 207 being lowered from —3.5 to —4.25 volts by the increase in voltage across resistor 253; and as soon as thyratrons 106 and 107 conduct current, a large voltage drop appears across the raise current limiting resistor 157 which greatly increases the negative grid bias to thyratrons 206 and 207, thus completely eliminating the possibility of all four thyratrons conducing simultaneously even with an improper adjustment of resistor 154.

Of course, an increase in electrode current greater than ½% results in a proportional increase in the thyratron grid voltage and in advancing the firing point of the thyratrons to the full-phased position when large corrections in electrode current are required.

Similarly, a drop in furnace electrode current to 99.5% of the selected value will result in the thyratrons 206 and 207 being energized approximately half phased. The motor is then operated in the reverse direction to lower the electrode and thereby increase the electrode current to within a fraction of one percent of the selected value.

In order to simplify the above explanation, it was assumed that the two pairs of thyratrons were adjusted by resistors 153 and 253 to pick up at the same voltage. Preferably and in accordance with a feature of the invention, however, the resistor 153 is rated or adjusted so that thyratron 107 does not pick up until the grid voltage of thyratron 106 has become sufficiently positive to fire full phased, and resistor 253 is rated or adjusted so that thyratron 207 picks up only after thyratron 206 is in full-phased operation. As a result, the minimum speed of the motor may be reduced considerably under one-quarter the full-phased speed. This will be explained with reference to Figs. 3 to 7.

Fig. 3 represents the above exemplified thyratron characteristics. Graph A represents the anode voltage of any one of the thyratrons, graph B the initial grid or pick-up voltage, and the line G the variable resultant direct-current voltage applied between cathode and grid of the tube. If the applied grid voltage normally of —3.5 volts, corresponding to 100% selected current, is caused to gradually rise in the positive direction, thyratron 106 is triggered as soon as the voltage reaches a value of —3 volts. Then, the thyratron 106 will conduct half phased and apply a voltage wave shape as illustrated by graph A1 in Fig. 4 to the motor, which will operate it at somewhat under ¼ speed.

A further rise in the applied grid voltage results in advancing the firing point of thyratron 106 and correspondingly increasing the motor speed until at the zero voltage level thyratron 106 starts conducting practically full phased as shown in Fig. 5.

A further slight increase in the positive applied grid voltage, depending on the setting of resistor 153 (Fig. 2) triggers the thyratron 107 at the half phased firing point as indicated by graph A2 in Fig. 6. This increases the voltage applied to the motor.

Continued rise in the applied grid voltage will gradually advance the firing point of thyratron 107 and the motor speed accordingly, until at approximately +3 volts bias both thyratrons conduct full phased as depicted in Fig. 7. Under the above-exemplified conditions full speed motor operation would result from an increase in electrode current to 105% of the selected value.

While the regulating sensitivity in respect to the firing characteristics of available thyratrons is fixed, it may be varied over a wide range by selection of voltage regulator tubes of various voltages.

It is obvious that, while the reversing circuit of Fig. 2 has been explained as applied for current regulation, it may be applied, by sustituting voltage transformers for the current transformers 150 and 250 (Fig. 2), as an electronic induction or step-type voltage regulator.

Other modifications will be recognized by those skilled in the art to be applicable with the invention without departing from the essence and features of the invention and within the scope of the claims annexed hereto.

I claim as my invention:

1. An electronic control system for energizing a direct-current load by controllable voltage from an alternating-current source, comprising alternating-current supply means, a load circuit, a plurality of controllable arc-discharge tubes connected between said load circuit and said supply means for full-wave rectification and having respective control circuits, a direct-current source of adjustable constant voltage and a direct-current source of condition-responsive voltage connected in series-opposed relation to each other to said control circuits so that each tube is impressed by a resultant unidirectional control voltage to be triggered between half-phased and substantially full-phased condition dependent upon the magnitude of said resultant voltage, and potentiometric impedance means associated with said control circuits to make said resultant voltages different from each other for triggering one of said tubes at one value of said condition-responsive voltage and triggering all of said tubes at another value of said condition-responsive voltage.

2. An electronic control system for energizing a direct-current load by controllable voltage from an alternating-current source, comprising alternating-current supply means, a load circuit, a plurality of controllable arc-discharge tubes connected between said load circuit and said supply means for full-wave rectification and having respective control circuits, a source of constant direct-current voltage having potentiometric resistance means with different voltage taps connected to said respective control circuits to impose thereon respectively different constant component control voltages, a source of condition responsive direct-current voltages connected to said control circuits to impose thereon equal component control voltages in series-opposition to said respective constant components so that said tubes are impressed by different unidirectional resultant control voltages to be triggered for half-phased conductance at different values of said condition-responsive voltage.

3. In a system according to claim 2, the difference between said constant component control voltages being at least about equal to the difference in resultant control voltage required for one of said tubes to vary its conductance between half-phased and full-phased values, so that another one of said tubes starts conducting only after said arc tube has substantially full-phased conductance.

4. An electronic control system for energizing a direct-current load by controllable voltage from an alternating-current source, comprising alternating-current supply means, a load circuit, a plurality of controllable arc-discharge tubes connected between said load circuit and said supply means for full-wave rectification and having respective control circuits, said control circuits having a common portion, a source of constant direct-current voltage having potentiometric resistance means, said resistance means having a portion connected in one of said control circuits, and having an adjustable other portion of said control circuits to provide different adjustable component control voltages for said tubes, a source of condition responsive direct-current voltage connected with said common portion of said control circuits to impose thereon a component control voltage in series-opposition to said respective constant components so that said tubes are impressed by different unidirectional resultant control voltages to be triggered for half-phased conductance at different values of said condition-responsive voltage.

5. An electronic motor control system, comprising alternating-current supply means, a direct-current motor, controllable arc-discharge tubes connected between said supply means and said motor for full wave rectification and having respective control circuits, a direct-current source of adjustable constant voltage connected with said control circuit, a circuit member connected with said motor and connected with said control circuits to provide said control circuits with variable direct-current voltage opposing said constant voltage in dependence upon an operating condition of said motor so that each tube is impressed by a resultant unidirectional control voltage to be triggered between half-phased and substantially full-phased condition dependent upon the magnitude of said resultant voltage, a resistor and a capacitor connected in parallel relation to each other in one of said control circuits to delay the increase of one of said resultant voltages during starting intervals of said motor.

6. An electronic motor control system, comprising alternating-current supply means, a direct-current motor, controllable arc-discharge tubes connected between said supply means and said motor for full wave rectification and having respective control circuits, said control circuits having a circuit portion in common, a direct-current source of adjustable constant voltage connected with said control circuit, a circuit member connected with said motor and connected with said common circuit portion to impress thereon a variable direct-current voltage opposing said constant voltage in dependence upon an operating condition of said motor so that each tube is impressed by a resultant unidirectional control voltage to be triggered between half-phased and substantially full-phased condition dependent upon the magnitude of said resultant voltage, a first resistor and a first capacitor connected in parallel relation to each other in one of said control circuits outside said common portion, a second resistor and a second capacitor connected in parallel to each other in said common circuit portion and having a time constant of capacitive charging in the order of the accelerating period of said motor, and said first resistor and first capacitor having a time constant larger than said period.

7. An electronic control system, comprising alternating-current supply means, a reversible direct-current motor, two sets of controllable arc-discharge rectifier tubes connected between said supply means and said motor for full-wave rectification and in mutually opposing polarity relative to said motor for running it in opposing directions, respectively, said sets having respective control circuits, condition-responsive voltage supply means connected with said control circuits for firing either set depending upon the direction of departure from a given value of a condition to be controlled, two resistors connected between said respective sets and said motor and disposed in said respective control circuits so that either set when firing imposes through one of said resistors a blocking bias on the other set.

8. An electronic control system, comprising alternating-current supply means, a reversible direct-current motor, two controllable rectifiers connected between said supply means and said motor for full-wave rectification and in mutually opposing polarity relative to said motor for running it in opposing directions respectively, each of said rectifiers including a thyratron having a grid circuit, condition-responsive voltage supply means connected with said grid circuits for triggering either thyratron depending upon the direction of departure from a given value of a condition to be controlled, two resistors connected between said respective rectifiers and said motor and disposed in said respective grid circuits so that either rectifier when conducting imposes through one of said resistors a blocking bias on the other thyratron of the other rectifier to prevent simultaneous conductance of said other rectifier.

9. An electronic control system, comprising alternating-current supply means, a reversible direct-current motor, two rectifying sets connected between said supply means and said motor for full-wave rectification and in mutually opposing polarity relative to said motor for running it in opposing directions respectively, each of said sets having a plurality of controllable arc discharge tubes connected with each other for full wave rectification and having respective control circuits, a source of constant direct-current voltage having potentiometric resistance means with different voltage taps connected to said respective control circuits to impose thereon respectively different constant component control voltages, a source of condition responsive direct-current voltage connected to said control circuits to impose thereon equal component control voltages in series-opposition to said respective constant components so that said tubes are impressed by different unidirectional resultant control voltages to be triggered for half-phased conductance at different values of said condition-responsive voltage, said two rectifying sets having their respective control circuits adjusted to cause said sets to conduct at different values of the condition responded to by said respective sources of condition-responsive voltage so as to cause said motor to run in the direction needed to maintain said condition between said values.

JOHN EDWIN RAYMOND.

No references cited.